United States Patent
Chopra et al.

(10) Patent No.: US 10,936,443 B2
(45) Date of Patent: Mar. 2, 2021

(54) SYSTEM AND METHOD FOR TAG BASED BACKUP INFRASTRUCTURE

(71) Applicant: EMC IP Holding Company LLC, Hopkinton, MA (US)

(72) Inventors: Shelesh Chopra, Bangalore (IN); Mohammed Abdul Samad, Bangalore (IN); Mahipat Kulkarni, Bangalore (IN); Gururaj Kulkarni, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 45 days.

(21) Appl. No.: 16/143,377

(22) Filed: Sep. 26, 2018

(65) Prior Publication Data
US 2020/0097371 A1 Mar. 26, 2020

(51) Int. Cl.
*G06F 11/14* (2006.01)
(52) U.S. Cl.
CPC ...... *G06F 11/1469* (2013.01); *G06F 11/1451* (2013.01); *G06F 2201/805* (2013.01); *G06F 2201/82* (2013.01)
(58) Field of Classification Search
CPC ............. G06F 11/1458; G06F 11/1469; G06F 11/2023
See application file for complete search history.

(56) References Cited

U.S. PATENT DOCUMENTS

| | | | |
|---|---|---|---|
| 9,112,777 B1 | 8/2015 | Barclay et al. | |
| 9,292,327 B1 | 3/2016 | von Thenen et al. | |
| 9,329,949 B2 * | 5/2016 | Sampath | G06F 11/0793 |
| 9,396,052 B2 * | 7/2016 | Sampath | G06F 11/008 |
| 9,417,978 B2 * | 8/2016 | Arata | G06F 11/20 |
| 9,720,783 B1 | 8/2017 | Kulkarni et al. | |
| 2009/0313447 A1 | 12/2009 | Nguyen et al. | |
| 2011/0083131 A1 | 4/2011 | Pirzada et al. | |
| 2011/0258481 A1 | 10/2011 | Kern | |
| 2013/0074072 A1 | 3/2013 | Kennedy | |
| 2014/0095868 A1 | 4/2014 | Korthny et al. | |
| 2014/0181038 A1 | 6/2014 | Pawar et al. | |
| 2015/0033221 A1 | 1/2015 | Chari et al. | |
| 2015/0263983 A1 | 9/2015 | Brennan et al. | |
| 2015/0269031 A1 | 9/2015 | Wang et al. | |
| 2016/0062858 A1 | 3/2016 | Gallagher et al. | |
| 2016/0134113 A1 | 5/2016 | Dushane et al. | |

(Continued)

OTHER PUBLICATIONS

"VSphere Data Protection Administration Guide: vSphere Data Protection 6.0"; VMware, Inc.; 2015.

(Continued)

*Primary Examiner* — Joseph R Kudirka
(74) *Attorney, Agent, or Firm* — Chamberlain, Hrdlicka, White, Williams & Aughtry

(57) ABSTRACT

A remote agent for managing resources includes a persistent storage that stores disaster recovery policies keyed to tags applied to the resources and a resource tagger that identifies a change in a resource; in response to identifying the change: performs an application priority analysis of the resource to identify a first tag based on the change in the resource; performs an interaction frequency analysis of the applications of the resource to identify a second tag; tags the resource with a tag; and performs a disaster recovery for the resource using a disaster recovery policy of the disaster recovery policies that is keyed to the tag.

20 Claims, 13 Drawing Sheets

(56) References Cited

U.S. PATENT DOCUMENTS

| | | |
|---|---|---|
| 2016/0179416 A1 | 6/2016 | Mutha et al. |
| 2016/0202923 A1 | 7/2016 | Liu et al. |
| 2017/0116040 A1 | 4/2017 | Cropper et al. |
| 2017/0185438 A1 | 6/2017 | Thomas et al. |
| 2017/0269954 A1 | 9/2017 | Hardy |
| 2018/0107561 A1 | 4/2018 | Bender et al. |
| 2018/0165166 A1* | 6/2018 | Wang .................. G06F 11/2033 |
| 2018/0276085 A1 | 9/2018 | Mitkar et al. |
| 2018/0285203 A1 | 10/2018 | Cox et al. |
| 2019/0235967 A1 | 8/2019 | Sharma |

* cited by examiner

US 10,936,443 B2

SYSTEM AND METHOD FOR TAG BASED BACKUP INFRASTRUCTURE

BACKGROUND

Computing devices may store information. The information may reflect information entered by a user. The information may be important to a user.

For example, a user may type information into a database, add data to a spreadsheet, or draft emails. Each of these interactions between a user and a community device may cause information important to a user to be stored in a computing device with which the user interacted.

SUMMARY

In one aspect, a remote agent for managing resources in accordance with one or more embodiments of the invention includes a persistent storage and a resource tagger. The persistent storage stores disaster recovery policies keyed to tags applied to the resources. The resource tagger identifies a change in a resource; in response to identifying the change: performs an application priority analysis of the resource to identify a first tag based on the change in the resource; performs an interaction frequency analysis of the applications of the resource to identify a second tag; tags the resource with a tag, the tag is one selected from a group consisting of the first tag and the second tag, the tag is the first tag when the first tag has a higher priority than the second tag and the tag is the second tag when the second tag has a higher priority than the first tag; and performs a disaster recovery for the resource using a disaster recovery policy of the disaster recovery policies that is keyed to the tag.

In one aspect, a method for managing resources in accordance with one or more embodiments of the invention includes identifying a change in a resource; in response to identifying the change: performing an application priority analysis of the resource to identify a first tag based on the change in the resource; performing an interaction frequency analysis of the applications of the resource to identify a second tag; tagging the resource with a tag, the tag is one selected from a group consisting of the first tag and the second tag, the tag is the first tag when the first tag has a higher priority than the second tag and the tag is the second tag when the second tag has a higher priority than the first tag; and performing a disaster recovery for the resource using a disaster recovery policy that is keyed to the tag.

In one aspect, a non-transitory computer readable medium in accordance with one or more embodiments of the invention includes computer readable program code, which when executed by a computer processor enables the computer processor to perform a method for managing resources. The method includes identifying a change in a resource; in response to identifying the change: performing an application priority analysis of the resource to identify a first tag based on the change in the resource; performing an interaction frequency analysis of the applications of the resource to identify a second tag; tagging the resource with a tag, the tag is one selected from a group consisting of the first tag and the second tag, the tag is the first tag when the first tag has a higher priority than the second tag and the tag is the second tag when the second tag has a higher priority than the first tag; and performing a disaster recovery for the resource using a disaster recovery policy that is keyed to the tag.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing resources. The resources may be virtual machines. The resource may be other entities without departing from the invention.

In one or more embodiments of the invention, the system manages the resources by providing disaster recovery services to the resources. The disaster recovery services may be orchestrated to minimize the time between when a disaster occurs and when the resources are restored after the disaster. By doing so, embodiments of the invention may improve an uptime of resources that are a part of a distributed computing environment.

To provide the disaster recovery services, the system may perform both application priority analysis and interaction frequency analysis of applications hosted by the resources to identify different tags. Tags may be metadata that indicates a level of importance of the resources. A tag, of the identified different tags, having the highest priority may be applied to a resource prior to a disaster. The priority specified by the tag may be used by the system to prioritize the resource for disaster recovery purposes.

Figure 1:
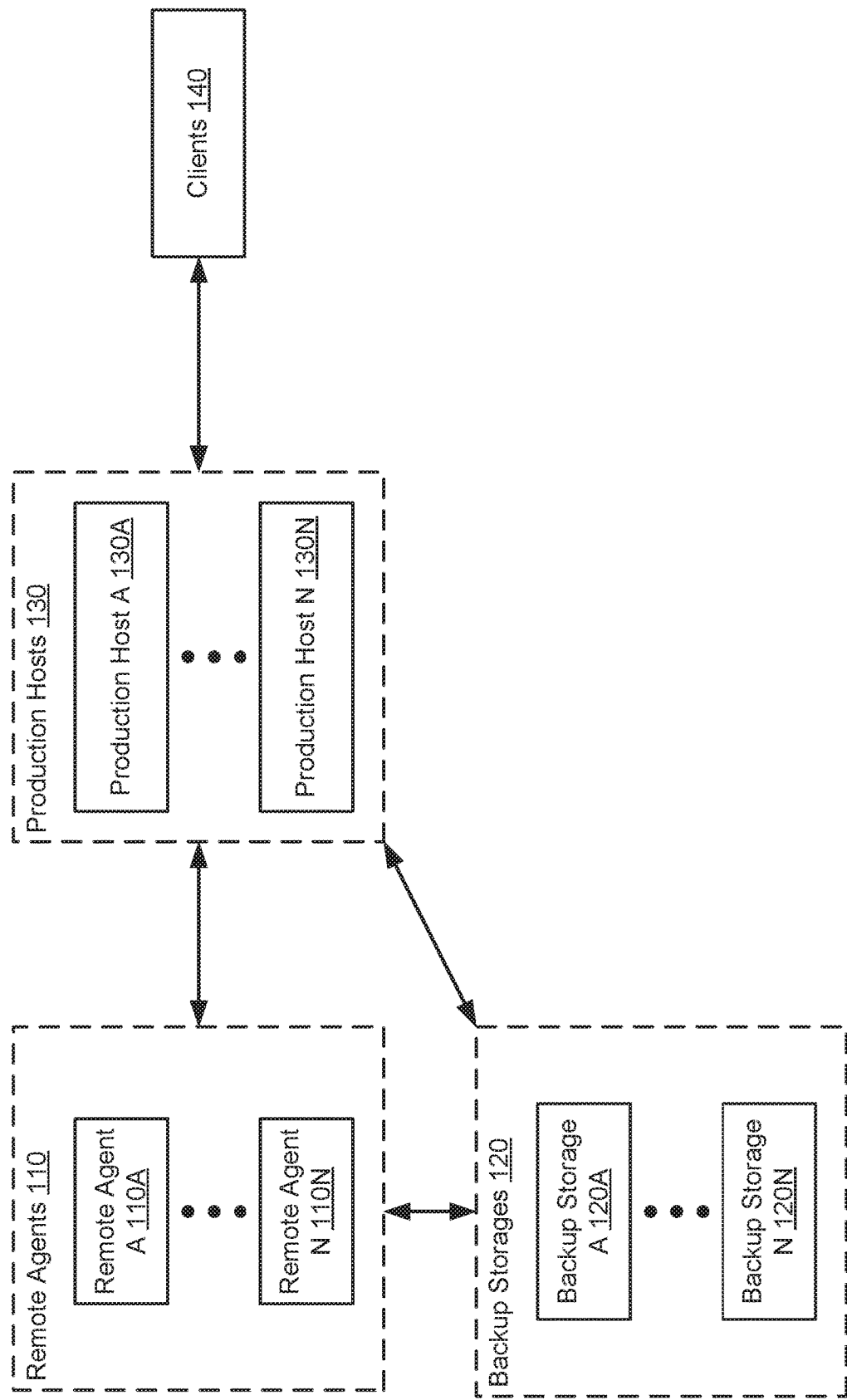
FIG. 1 shows a diagram of a system in accordance with one or more embodiments of the invention.

FIG. 1 shows an example system in accordance with one or more embodiments of the invention. The system may include clients (140) that obtain services from resources hosted by production hosts (130). The resources may be, for example, virtual machines that are, in turn, hosting applications. For additional details regarding production hosts, see e.g., FIG. 2A. For additional details regarding virtual machines, see e.g., FIG. 2B.

The remote agents (110) may orchestrate restoration of the resources of the production hosts (130) to recover from disasters. For example, in a scenario in which the production hosts (130) are destroyed or otherwise rendered inoperable, the remote agents (110) may restore the resources of the production hosts (130) on other production hosts (not shown) to ensure that the clients (140) have access to the resources or otherwise restore access to the resources. The remote agents (110) may utilize backups of the resources stored in backup storages (120) when restoring the resources.

Figure 4A:
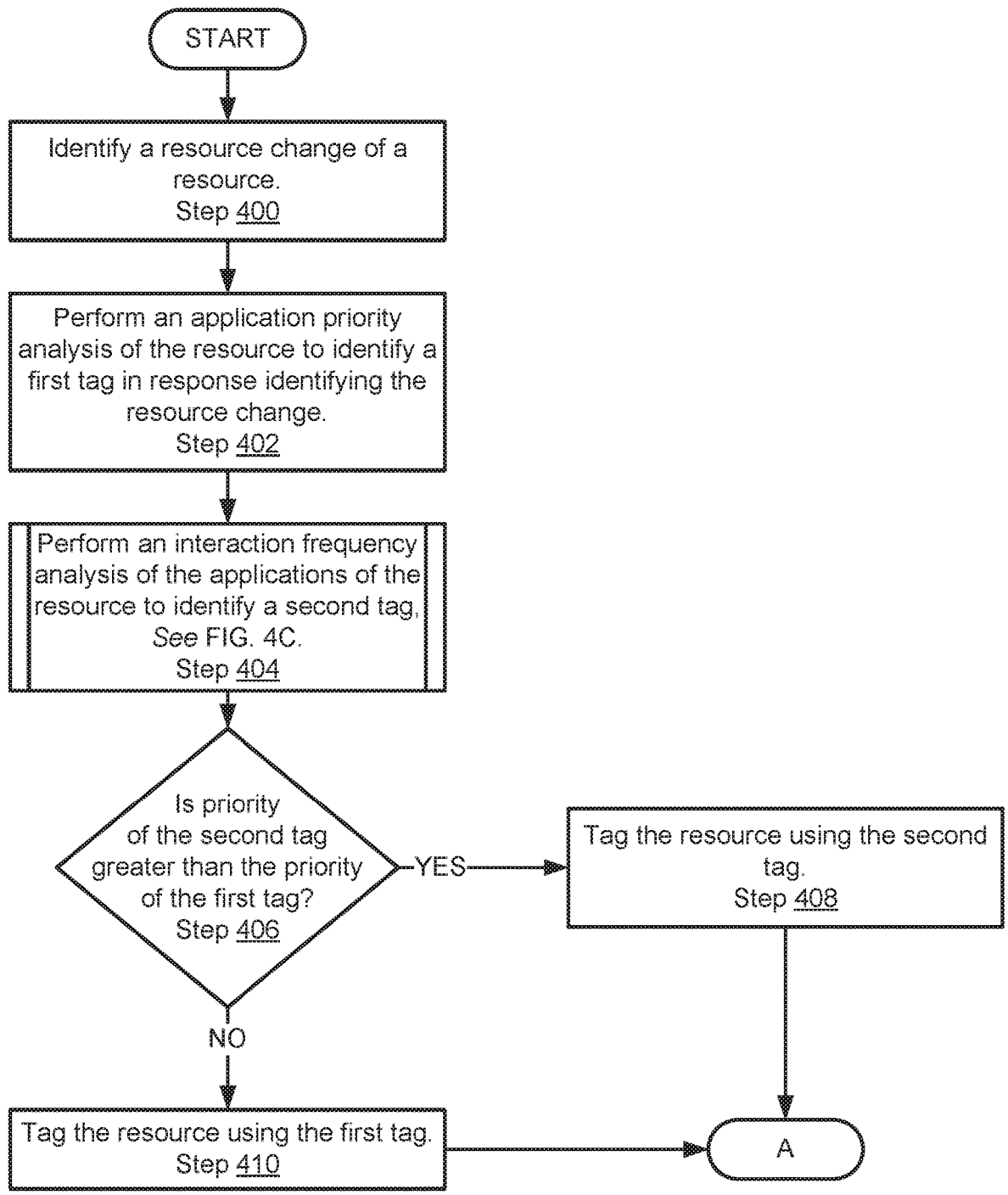
FIG. 4A shows a flowchart of a method of managing resources in accordance with one or more embodiments of the invention.
Figure 4B:
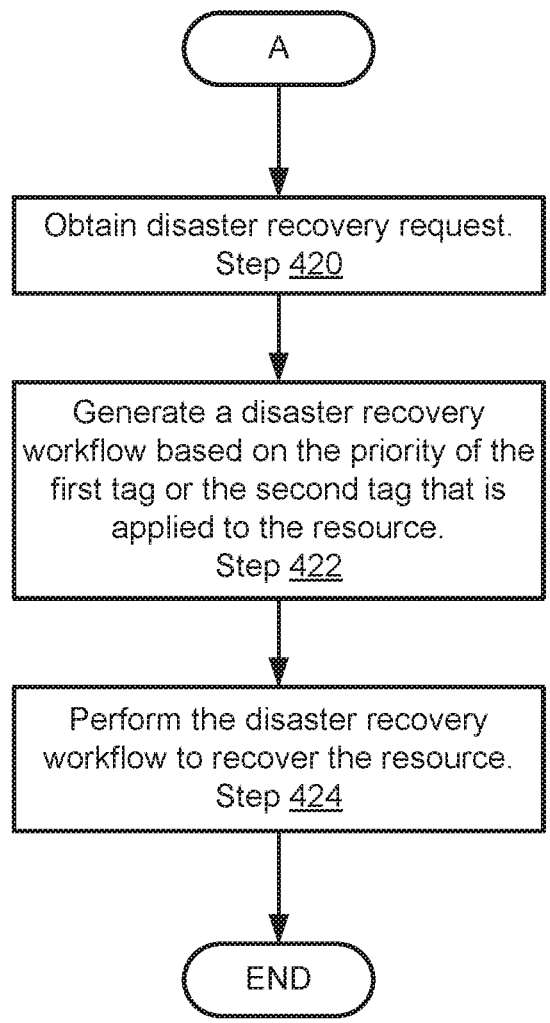
FIG. 4B shows a flowchart of a continuation of the method of managing resources in accordance with one or more embodiments of the invention.
Figure 4C:
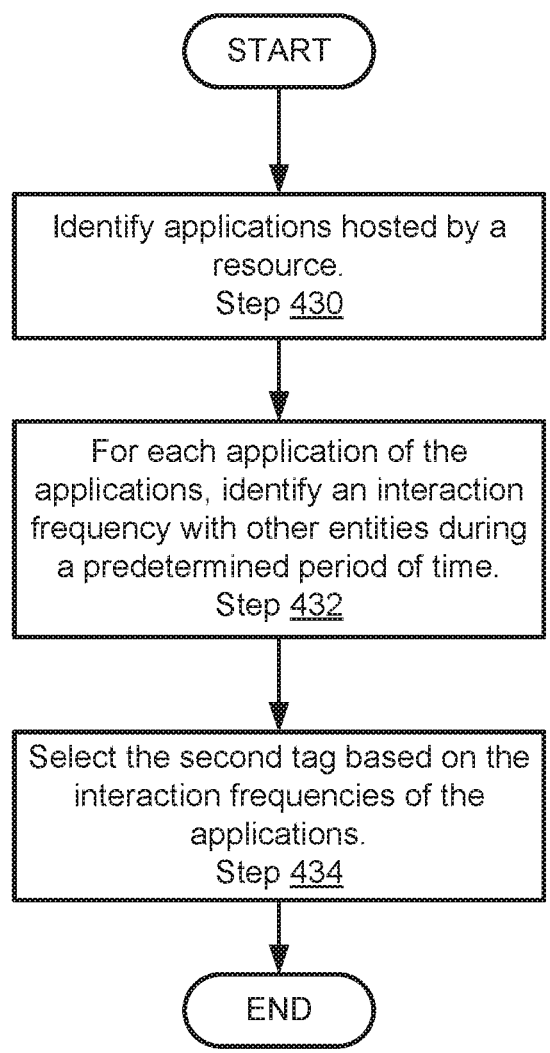
FIG. 4C shows a flowchart of a method of performing an interaction frequency analysis in accordance with one or more embodiments of the invention.

Prior to the disaster, the remote agents (110) may monitor the resources and modify the tags applied to resources as part of managing the resources. In one or more embodiments of the invention, the remote agents (110) perform the methods illustrated in FIGS. 4A-4C to manage the resources. A non-limiting example of managing resources in accordance with the methods of FIGS. 4A-4C is illustrated in FIGS. 5A-5G.

In response to disasters, the remote agents (110) may perform disaster recovery workflows. The disaster recovery workflows may be specified by policies that are keyed to the tags applied to the resources. In this manner, the disaster recovery workflows may take into account the tags applied to the resources. For additional details regarding disaster recovery policies, see e.g., FIG. 3B. For additional details regarding remote agents, see e.g., FIG. 3A. Each component of the system of FIG. 1 is discussed below.

The clients (140) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The clients (140) may be other types of computing devices without departing from the invention. For additional details regarding computing devices, see e.g., FIG. 6.

The clients (140) may interact with resources hosted by the production hosts (130). For example, the resources may be virtual machines. The virtual machines may host applications such as, for example, databases, email servers, or any other type of application. The clients (140) may utilize services provided by these examples of applications or other application types hosted by the production hosts (130). By utilizing the services of the applications, data that is important to the clients (140) may be stored as part of application data for each respective application on the production hosts (130) or at other locations.

For example, a production host may host an email application. One of the clients may utilize the services of the email application by receiving and sending emails via the email application. Copies of the client's emails may be stored as part of the email application data. By doing so the email application may host data in the form of emails that are important to the client.

In one or more embodiments of the invention, the clients (140) may apply tags to resources hosted by the production hosts (130). For example, the clients (140) may determine that different resources hosted by the production hosts (130) have different levels of importance relative to the clients. In such a scenario, the clients (140) may apply tags to the resources based on the different levels of importance of the resources to the clients.

In one or more embodiments of the invention, a tag is metadata. In other words, the tag may be a data structure associated with a resource. For example, a tag may be a string of characters such as "high importance" or "low importance". Tags may be stored in any format and in any location without departing from the invention. For example, the tags may be stored on production hosts, in backup storage, or in other locations. Additionally, the tags may be stored with other types of data, may be spanned across any number of devices, and/or may be stored in any number of separate data structures without parting from the invention.

In one or more embodiments of the invention, the taking behavior of clients may be self-directed. For example, users of the clients may be expected to apply tags without prompting from the system. However, such self-directed taking behavior can be problematic. For example, users may not apply appropriate tags to different resources and/or may apply in appropriate tags to different resources. One or more embodiments of the invention may provide a method for remediating poor tagging habits of users. For example, embodiments of the invention may perform an analysis of the distributed system in which the clients operate and make system-level decisions regarding the importance of resources hosted by the production hosts. Based on the system-level decisions, appropriate tags may be applied to the resources without notifying users or acquiring user intervention. In this manner, embodiments of the invention reduce a cognitive burden on a user of the system while improving the reliability of the distributed system.

In one or more embodiments of the invention, the production hosts (130) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and all, or a portion thereof, of the methods illustrated in FIGS. 4A-4C. The production hosts (130) may be other types of computing devices without departing from the invention. For additional details regarding computing devices, see e.g., FIG. 6.

In one or more embodiments of the invention, the production hosts (130) are distributed computing devices. As used herein, a distributed computing device refers to functionality provided by a logical device that utilizes the computing resources of one or more separate and/or distinct computing devices. For example, in one or more embodiments of the invention, the production hosts (130) may be distributed devices that include components distributed across any number of separate and/or distinct computing devices. In such a scenario, the functionality of the production hosts (130) may be performed by multiple different computing devices without departing from the invention.

In one or more embodiments of the invention, the production hosts (130) host resources. The resources may be, for example, virtual machines that host applications that provide services to the clients. The clients may interact with the resources hosted by the production hosts (130).

In one or more embodiments of the invention, the production hosts (130) host data that is valuable to the clients (140). For example, as clients interact with the resources hosted by the production hosts (130) data that is relevant to the clients (140) may be stored in application data of the resources. Accordingly, reliability of the data of the production hosts (130) may be valuable to clients (140). For example, clients (140) may store data in a database hosted by the production hosts (130). Ensuring that the production hosts (130) or able to provide access to the data in the database in the future may be important to the clients (140). One or more embodiments of the invention may improve the reliability of accessing data stored in the production hosts (130). For additional details regarding the production hosts (130), see e.g., FIG. 2A.

In one or more embodiments of the invention, the remote agents (110) are computing devices. A computing device may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of remote agents (110) described in this application and all, or a portion thereof, of the methods illustrated in FIGS. 4A-4C. The remote agent (110) may be other types of computing devices without departing from the invention. For additional details regarding computing devices, see e.g., FIG. 6.

In one or more embodiments of the invention, the remote agents (110) are distributed computing devices. As used herein, a distributed computing device refers to functionality provided by a logical device that utilizes the computing resources of one or more separate and/or distinct computing devices. For example, in one or more embodiments of the invention, the remote agent (110) may be distributed devices that include components distributed across any number of separate and/or distinct computing devices. In such a scenario, the functionality of the remote agent (110) may be performed by multiple different computing devices without departing from the invention.

In one or more embodiments of the invention, the remote agents (110) manage the resources of the production hosts. To manage the resource of the production hosts, the remote agents (110) may provide backup and/or restoration services to the production hosts. To provide backup services to the production hosts, the remote agents (110) may store backup data for the production hosts in backup storages (120). To provide restoration services to the production hosts (130), the remote agents (110) may utilize previously stored backup data from the backup storages (120).

In one or more embodiments of the invention, the remote agents (110) may provide disaster recovery services to the system of FIG. 1. Disaster recovery services include performing a restoration of any number of resources hosted by the production hosts in new locations rather than a location rendered inoperable or otherwise impaired due to a disaster. As used herein, a disaster refers to a change in state of a portion of the production hosts (130) to and in operable or impaired state. In such a state, the resources hosted by the portion of the production hosts (130) may not be able to provide services to the clients (140).

To facilitate providing of disaster recovery services to the production hosts (130), the remote agents (110) may proactively put in place a plan for providing the disaster recovery services that minimizes the downtime of the resources of the production hosts (130). To put in place the plan, the remote agents (110) may perform a system-level analysis the production hosts to identify the relative importance of the resources hosted by the production hosts. The plan for providing disaster recovery services to the production hosts (130) may be based on the system-level analysis. In one or more embodiments of the invention, the system-level analysis includes characterizing an interaction frequency of each resource hosted by the production hosts (130). For additional details regarding remote agents, see e.g., FIG. 3A.

In one or more embodiments of the invention, the backup storages (120) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device that cause the computing device to provide the functionality of the backup storages (120) described through this application and all, or a portion, of the methods illustrated in FIG. 4A-4C. For additional details regarding computing devices, see e.g., FIG. 6.

In one or more embodiments of the invention, the backup storages (120) are distributed computing devices. As used herein, a distributed computing device refers to functionality provided by a logical device that utilizes the computing resources of one or more separate and/or distinct computing devices. For example, in one or more embodiments of the invention, the backup storages (120) may be distributed devices that include components distributed across any number of separate and/or distinct computing devices. In such a scenario, the functionality of the backup storages (120) may be performed by multiple different computing devices without departing from the invention.

In one or more embodiments of the invention, the backup storages (120) store data from the production hosts (130).

The data may reflect the state of resources hosted by the production hosts (130). The data may be, for example, virtual machine images, incremental backups, application images, or incremental backups of applications. Other types of data may be stored in the backup storages (120) without departing from the invention. Any quantity of data may be stored in the backup storages (120) without departing from the invention. The data may be associated with respective resources, e.g., applications or virtual machines. from which the data was obtained.

In one or more embodiments of the invention, the backup storages (120) deduplicate the backup data against existing data stored in the backup storages. By deduplicating the data, the quantity of data that can be stored in the backup storages may be increased when compared to storing the data without deduplication. To deduplicate the data, the backup storages (120) may only store copies of unique portions of the data. When storing the data, the data may first be checked to determine whether it is duplicative of data already stored in the backup storage. Only the unique portions of the data may be stored in the backup storage. Storing and accessing deduplicated data may be significantly more computing resource costly than storing data that is not deduplicated.

Figure 2A:
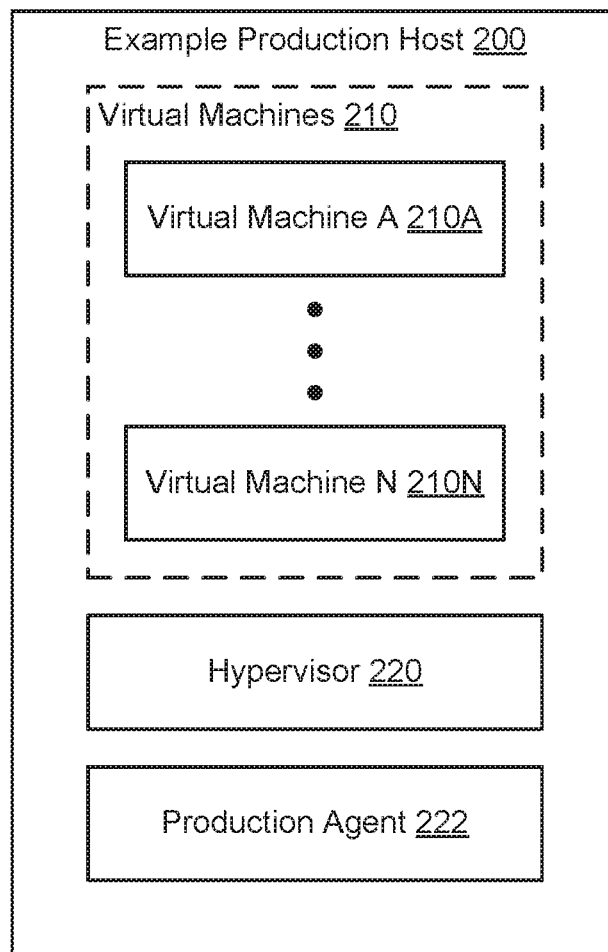
FIG. 2A shows a diagram of an example production host in accordance with one or more embodiments of the invention.

As discussed above, the backup storages may store data obtained from the production hosts (130). FIG. 2A shows a diagram of an example production host (200) in accordance with one or more embodiments of the invention.

In one or more embodiments of the invention, the example production host (200) hosts virtual machines (210). The virtual machines (210) may host any number of applications as will be described in greater detail with respect to FIG. 2B. Each of the virtual machines (210A, 210N) may host similar or different applications without departing from the invention.

In one or more embodiments of the invention, the example production host (200) includes a hypervisor (220). The hypervisor (220) may allocate computing resources to the virtual machines (210). For example, the hypervisor (220) may dedicate processor cycles, memory space, and storage space for use by the virtual machines (210).

In one or more embodiments of the invention, the hypervisor (220) is a hardware device including circuitry. The hypervisor (220) may be, for example, a digital signal processor, a field programmable gate array, or an application specific integrated circuit. The hypervisor (220) may be other types of hardware devices without departing from the invention.

In one or more embodiments of the invention, the hypervisor (220) is implemented as computing code stored on a persistent storage that when executed by a processor performs the functionality of the hypervisor (220). The processor may be a hardware processor including circuitry such as, for example, a central processing unit or a microcontroller. The processor may be other types of hardware devices for processing digital information without departing from the invention.

In one or more embodiments of the invention, the example production host (200) includes a production agent (222). The production agent (222) may orchestrate the generation of backups of entities hosted by the example production host (200). For example, the production agent (222) may orchestrate the generation of backups of the virtual machines or applications hosted by the virtual machines. When orchestrating the generation of backups or restoration of resources of the example virtual machine (230), the production agent (222) may perform all or a part of the methods illustrated in FIGS. 4A-4C.

In one or more embodiments of the invention, the production agent (222) is a hardware device including circuitry. The production agent (222) may be, for example, a digital signal processor, a field programmable gate array, or an application specific integrated circuit. The production agent (222) may be other types of hardware devices without departing from the invention.

In one or more embodiments of the invention, the production agent (222) is implemented as computing code stored on a persistent storage that when executed by a processor performs the functionality of the production agent (222). The processor may be a hardware processor including circuitry such as, for example, a central processing unit or a microcontroller. The processor may be other types of hardware devices for processing digital information without departing from the invention.

Figure 2B:
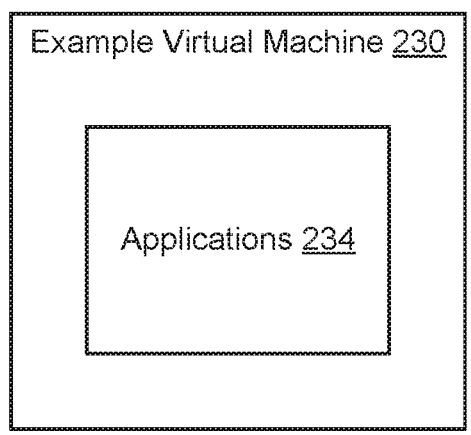
FIG. 2B shows a diagram of a virtual machine in accordance with one or more embodiments of the invention.

As discussed above, production hosts may host virtual machines. FIG. 2B shows a diagram of an example virtual machine (230) in accordance with one or more embodiments of the invention. The example virtual machine (230) may be a virtualized entity utilizing computing resources of one or more production hosts. The example virtual machine (230) may host any number of applications (234). The applications (234) may be, for example, transactional databases, email servers, file storage, or any other type of application that may provide services to clients. The applications (234) may provide services to other entities without departing from the invention.

Applications (234) may utilize computing resources of the virtual machine hosting applications. The computing resources may be, in turn, allocated to the virtual machine hosting the applications from a production host hosting the virtual machine.

Figure 3A:
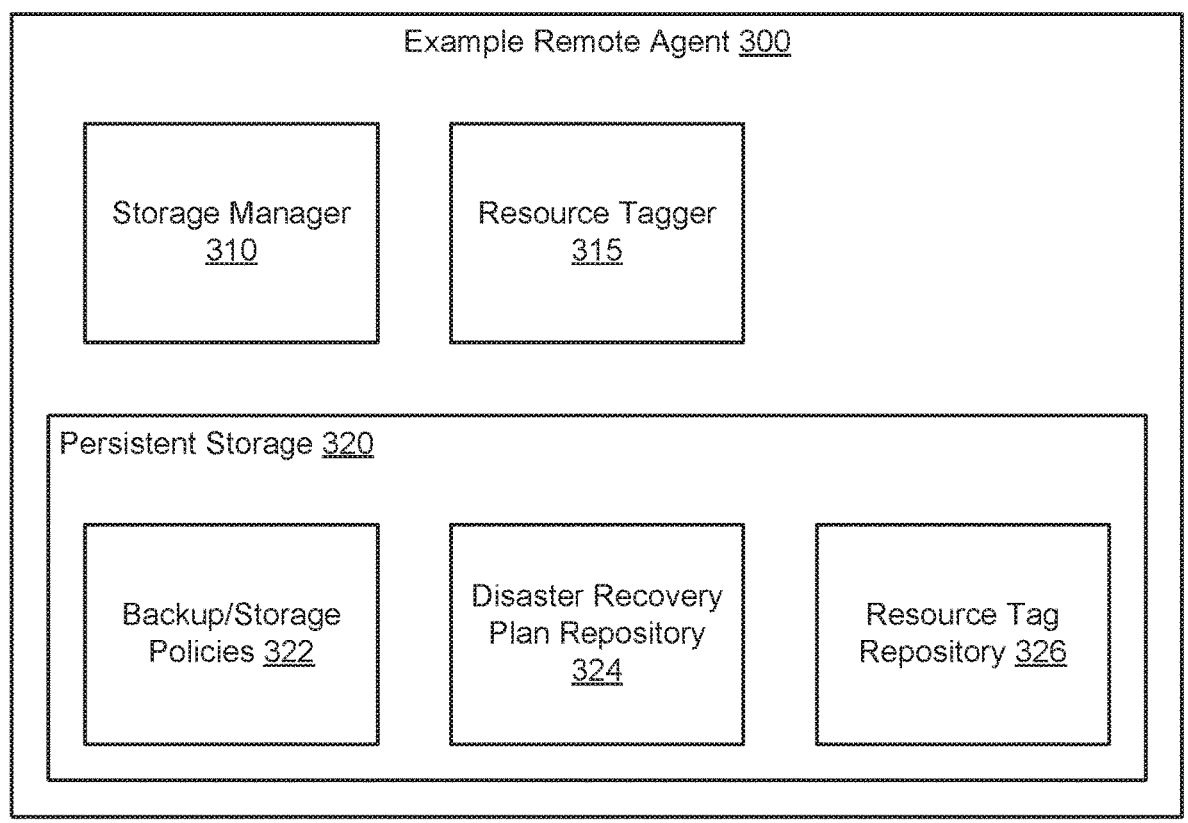
FIG. 3A shows a diagram of an example remote agent in accordance with one or more embodiments of the invention.

As discussed above, the remote agents may orchestrate storage of production host data in backup storage. Additionally, the remote agents may also provide restoration services to resources hosted by the production hosts. FIG. 3A shows a diagram of an example remote agent (300) in accordance with one or more embodiments of the invention.

In one or more embodiments of the invention, the example remote agent (300) manages resources of the production hosts. For example, as discussed above, the example remote agent (300) may provide backup and restoration services to the resources of the production hosts.

To provide the aforementioned functionality, the example remote agent (300) includes a storage manager (310), a resource tagger (315), and a persistent storage (320). Each component of the example remote agent (300) as discussed below.

In one or more embodiments of the invention, the storage manager (310) orchestrates generation of backups and performance of restorations, as discussed above. The backup manager (310) may perform all, or a portion, of the methods illustrated in FIGS. 4A-4C when performing its functionality.

For example, the storage manager (310) may perform backup generation in accordance with backup policies stored in the backup/restoration policies (322). The backup policies may specify workflows for perform backups.

In one or more embodiments of the invention, the backup policies of the backup/restoration policies (322) may be keyed to tags applied to virtual machines by users or tags applied to virtual machines by other entities. For example, the backup policies and specify a workflow upon the occurrence of the condition. The specified workflow may be applied to virtual machines, or other entities, having a predetermined tag applied to the respective virtual machines.

In one or more embodiments of the invention, the storage manager (310) may perform a disaster recovery workflow specified in a disaster recovery plan repository (324). The disaster recovery workflow to be predicated upon the occurrence of a disaster. The disaster recovery workflow may be keyed to tags applied to resources hosted by production hosts. Thus, the storage manager (310) may perform disaster recovery workflows that are based on tags previously applied to the resources. One or more embodiments of the invention may automatically apply appropriate tags to the resources of the production hosts to ensure otherwise improve the process performing a disaster recovery workflow.

In one or more embodiments of the invention, the storage manager (310) is a hardware device including circuitry. The storage manager (310) may be, for example, a digital signal processor, a field programmable gate array, or an application specific integrated circuit. The storage manager (310) may be other types of hardware devices without departing from the invention.

In one or more embodiments of the invention, the storage manager (310) is implemented as computing code stored on a persistent storage that when executed by a processor performs the functionality of the storage manager (310). The processor may be a hardware processor including circuitry such as, for example, a central processing unit or a microcontroller. The processor may be other types of hardware devices for processing digital information without departing from the invention.

In one or more embodiments of the invention, the resource tagger (315) automatically applies tags to resources hosted by production hosts. For example, the resource tagger (315) may apply tags to resources to ensure the disaster recovery plan is keyed to appropriate resources of the production hosts.

To determine appropriate tags to apply to resources, the tagger (315) may perform an interaction frequency analysis of the resources. Based on the outcome of the interaction frequency analysis, the tagger (315) may apply a predetermined tag. For example, the interaction frequency analysis may identify that a resource both interacts frequently with and among a large number of resources of the production hosts. Based on this analysis, to tags may be applied to the resource. The first tag may represent the high rate of interaction of the resource with other resources. The second tag may represent the wide degree of interaction of the resource. Such tags may indicate that the resource is of high importance for disaster recoveries because of the resource's high and wide ranging interactivity.

By doing so, embodiments of the invention may ensure that resources of the production hosts are appropriately tagged for disaster recovery purposes. Because of the appropriate tagging, disaster recovery workflows may be keyed to these appropriate tags and, consequently, rely on the presence of these tags. To provide the aforementioned functionality, the resource tagger (315) may perform all, or a portion, of the methods illustrated in FIGS. 4A-4C.

For example, the resource tagger (315) may apply tags to virtual machines, or other entities, dynamically. In response to changes with respect to the virtual machines, or other entities, the resource tagger (315) may automatically reevaluate the validity of the tags already applied to the virtual machines for disaster recovery purposes. The tags may be updated dynamically throughout the life of each resource.

In one or more embodiments of the invention, tags applied to resources may be noted in a resource tag repository (326). For example, the resource tagger (315) may automatically store a copy of the tag, information representative of the applied tag, in the resource tag repository (326) before, during, or after application of the tag. By doing so, the resource tag repository (326) may document the tags applied to the resources for the production hosts for disaster recovery purposes.

In one or more embodiments of the invention, the resource tagger (315) is a hardware device including circuitry. The resource tagger (315) may be, for example, a digital signal processor, a field programmable gate array, or an application specific integrated circuit. The resource tagger (315) may be other types of hardware devices without departing from the invention.

In one or more embodiments of the invention, the resource tagger (315) is implemented as computing code stored on a persistent storage that when executed by a processor performs the functionality of the resource tagger (315). The processor may be a hardware processor including circuitry such as, for example, a central processing unit or a microcontroller. The processor may be other types of hardware devices for processing digital information without departing from the invention.

In one or more embodiments of the invention, the persistent storage (320) is a storage device that stores data structures. The persistent storage (320) may be a physical or logical device. For example, the persistent storage (320) may include solid state drives, solid state drives, tape drives, and other components to provide data storage functionality. Alternatively, the persistent storage (320) may be a logical device that utilizes the physical computing resources of other components to provide data storage functionality.

In one or more embodiments of the invention, the persistent storage (320) stores backup/restoration policies (322), a disaster recovery plan repository (324), and a resource tag repository (326). Each of these data structures as discussed below.

The backup/restoration policies (322) may be data structures that specify the workflows for generating backups and perform restorations of entities. The policies of the backup/restoration policies (322) may specify any number of characteristics of the workflows including, but not limited to, when a backup is generated, where it is stored, and a redundancy of the storage.

The disaster recovery plan repository (324) may be a data structure that specifies workflows for performing recoveries in response to various types of disasters. The workflows specified by the disaster recovery plan repository (324) may be keyed to tags applied to the resources. For example, the workflows specified by the disaster recovery plan repository (324) may specify an order for performing restorations of the resources based on the tags applied the resources. The disaster recovery plan repository (324) may specify any number of characteristics of the workflows for disaster recovery purposes. For additional details regarding disaster recovery plans that govern workflows performed disaster recovery scenarios, see e.g., FIG. 3B.

The resource tag repository (326) may be a data structure that specifies the tags that have been applied to resources for disaster recovery purposes. For example, the resource tag repository (326) may indicate different tags that have been applied to different resources hosted by the production hosts.

As the tags applied to the resources change, the content of the resource tag repository (326) may be continuously updated to reflect such changes.

Figure 3B:
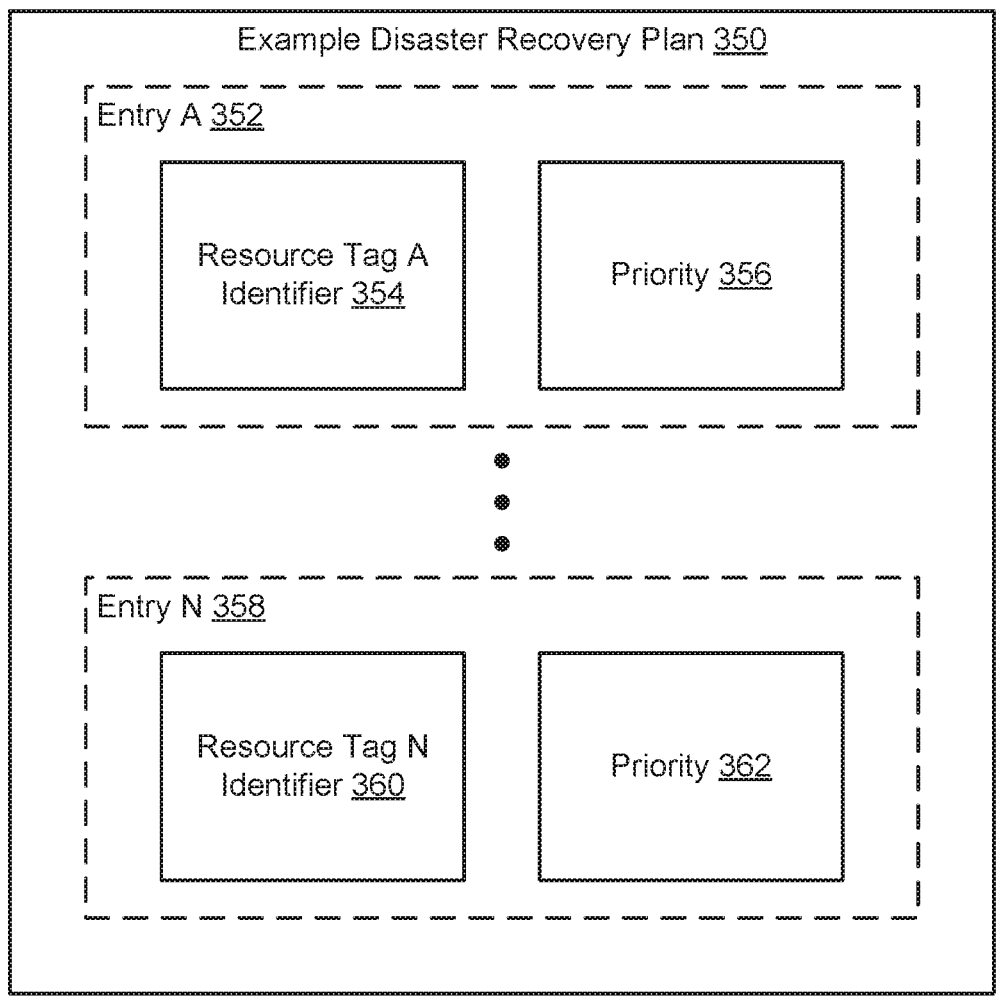
FIG. 3B shows a diagram of an example disaster recovery plan in accordance with one or more embodiments of the invention.

As discussed above, specific workflows may be performed in disaster recovery scenarios to bring the resources of the production hosts back online as quickly as possible. Such workflows may be specified by disaster recovery plans stored in the disaster recovery plan repository (324). FIG. 3B shows a diagram that example disaster recovery plan (350) in accordance with one or more embodiments of the invention. The example disaster recovery plan (350) prioritizes restoration of resources of the production hosts.

For example, the example disaster recovery plan (350) may include any number of entries (e.g., 352, 358). Each entry may specify a resource tag identifier (e.g., 354, 360) and a priority (e.g., 356, 362). The priority may indicate the relative importance of resources tagged with the tag specified by the corresponding resource tag identifier of the entry. In this manner, different resources may be discriminated against for restoration priority purposes and disaster recovery scenarios. Thus, the example disaster recovery plan (350) may specify a general ordering of restorations of resources to be performed in response to disaster. As noted above, the ordering of the restorations may be intelligently selected to minimize the time required to perform the restorations and/or to improve the speed at which higher priority resources are restored.

While the example data structures illustrated in FIGS. 3A-3B are shown as a separate data structures, the data structures may be stored along with other data, stored in other locations, may be divided into any number of data structures, and/or spanned across any number of devices without departing from the invention.

As discussed above, components of the system of FIG. 1 may perform methods for prioritizing resources for restoration purposes and performing restorations in response to disasters, in addition to other functions. FIGS. 4A-4C show methods in accordance with one or more embodiments of the invention that may be performed by components of the system of FIG. 1.

FIG. 4A shows a flowchart of a method in accordance with one or more embodiments of the invention. The method depicted in FIG. 4A may be used to prioritize resources for restoration in disaster recoveries in accordance with one or more embodiments of the invention. The method shown in FIG. 4A may be performed by, for example, a remote agent (e.g., 110, FIG. 1). Other components of the system illustrated in FIG. 1 may perform the method of FIG. 4A without departing from the invention.

In step 400, a resource change of a resource is identified.

In one or more embodiments of the invention, the resource change is a removal of an application from a virtual machine. The resource may be the virtual machine that hosted the now removed application. For example, an instance of an application executing using computing resources of the virtual machine may be terminated or migrated to another entity.

In one or more embodiments of the invention, the resource change is the addition of an application to a virtual machine. For example, an instance of an application may be instantiated using computing resources of the virtual machine. Thus, the instantiated application may be hosted by the virtual machine.

The resource change may be other types of resource changes without departing from the invention. For example, the resource change may be a reallocation of computing resources to or from the resource. If the resource is a virtual machine, the addition or removal of computing resources of the production, host hosting the virtual machine, dedicated for execution of the virtual machine may be a resource change.

In step 402, an application priority analysis of the resource is performed to identify a first tag in response to identifying resource change.

In one or more embodiments of the invention, the application priority analysis is performed by matching the identity of the resource to the first tag. For example, the first tag may be stored in a repository and associated with identity of the application. The resource tag repository may include any number of such associations. Thus, resource tag repository may be used to identify a priority of any application based on an identity of the application.

In step 404, an interaction frequency analysis of the applications of the resource is performed to identify a second tag.

In one or more embodiments of the invention, the interaction frequency analysis is performed by determining: (i) a frequency of interaction between the resource and other entities and (ii) an extent of interaction between the resource and other entities. For example, the frequency of interaction may be the number of transactions between the resource and other entities. In a scenario in which the resource is a database, the frequency of accessing the database that other entities may be the frequency of interaction between the resource and the other entities. In another example, the extent of interaction between the resource and other entities may be a cardinality of the other entities that interact with the resource. In a scenario in which the resource is a database having four other entities that store and retrieve data from the database, the extent of interaction between the resource and the other entities may be four.

In a scenario in which the resource is a virtual machine hosting a number of different applications, the interaction frequency analysis may be performed for each of the different applications. An aggregate determination of the frequency and extent of interaction may then be generated by summing, or otherwise incorporating, the interaction frequency analysis for each of the different applications.

In one or more embodiments of the invention, the second tag is identified based on the interaction frequency analysis. For example, resources having high interaction frequencies may warrant a second tag having a high priority. In contrast, resources having low interaction frequencies they warrant the second tag having a low priority.

In one or more embodiments of the invention, the second tag is identified from heuristic knowledge. For example, the outcome of the interaction frequency analysis for different resources may be used generate a sliding scale of priorities for different resources. The sliding scale may be a properly weighted with respect to the priorities that may be specified by the first tag.

In one or more embodiments of the invention, the interaction frequency analysis of the applications of the resource is performed via the method illustrated in FIG. 4C. The interaction frequency analysis of the applications of the resource may be performed via other methods about parting from the invention.

In step 406, it is determined whether the priority of the second tag is greater than the priority of the first tag. As discussed above, different tags may indicate different levels of priority for restoration purposes and disaster recovery scenarios. If the priority of the second tag is greater than the priority of the first tag, then the method may proceed to step

408. The priority of the second tag is not greater than the priority of the first tag, then the method may proceed to step 410.

In step 408, the resource is tagged using the second tag. The method may continue in FIG. 4B after step 408.

As noted above, if the priority of the second tag is not greater than the priority of the first tag, than the method may proceed to step 410 following step 406.

In step 410, the resource is tagged using the first tag. As noted above, the first tag may be based on heuristically derived priorities for different types of applications. In other words, based on identity of the resource or components of the resource. In contrast, the second tag may be based on an interaction frequency analysis of the resource. Thus, the first tag and the second tag may reflect different characteristics of the resource. However, the priorities the first and second tag may be based on a similar scale and thus, may be directly compared.

The method may continue in FIG. 4B after step 410.

As discussed above, FIG. 4B shows a continuation of the flowchart of the method shown in FIG. 4A.

In step 420, a disaster recovery request is obtained.

In one or more embodiments of the invention, the disaster recovery request specifies a type of the disaster. The type of the disaster may be matched to a disaster recovery workflow specified in a disaster recovery plan repository.

In one or more embodiments of the invention, the disaster recovery request is obtained from a production host. The production host may be an entity impacted, directly or indirectly, by a disaster. For example, the production host may be a part of a group of production hosts that were at least partially taken off-line due to a power failure of a supply that supplies power to the group of production hosts. The disaster recovery request may be obtained from other entities without departing from the invention.

In step 422, disaster recovery workflow is generated based on the priority of the first tag or the second tag that is applied to the resource. As discussed above, in disaster recovery scenarios each of the resources that needs to be recovered due to a disaster may be prioritized based on the priority of the tags applied to the resources.

In one or more embodiments of the invention, the disaster recovery workflow is generated based on a policy for the type of disaster that has occurred. The policy may prioritize restoration of impacted resources based on the tags applied to the resources. The workflow may include performing the restorations in an order specified by the policy and the tags applied to the resources.

In step 424, the disaster recovery workflow is performed to recover the resource.

In one or more embodiments of the invention, the disaster recovery workflow includes performing restorations for multiple resources. A first portion of the multiple resources may be restored before the resource is restored. Second portion of the multiple resources may be restored after resources restored. Each of the first portion of the multiple resources may have tags having higher priorities than tags applied to the resource. Each of the second portion of the multiple resources may have tags having lower priorities than tags applied to the resource. In this manner, embodiments of the invention may provide for prioritization of restoration of resources in disaster recovery scenarios.

The method may end following step 424.

FIG. 4C shows a flowchart of a method in accordance with one or more embodiments of the invention. The method depicted in FIG. 4C may be used to perform an interaction frequency analysis in accordance with one or more embodiments of the invention. The method shown in FIG. 4C may be performed by, for example, a remote agent (e.g., 110, FIG. 1). Other components of the system illustrated in FIG. 1 may perform the method of FIG. 4C without departing from the invention.

In step 430, a number of applications hosted by resource are identified.

In one or more embodiments of the invention, the resource is a virtual machine. The applications may utilize computing resources of the virtual machine for execution.

In step 432, for each application identified in step 430, and interaction frequency with other entities is identified during a predetermined period of time.

In one or more embodiments of the invention, the interaction frequency is the rate at which application transacts with other entities. Other entities may be, for example, clients, virtual machines, or other applications. Entities may be other types of virtualized or physical devices.

In one or more embodiments of the invention, the predetermined period of time is one hour. The predetermined period of time may have other durations without departing from the invention. For example, the predetermined period of time may change in response to predetermined event such as a utilization rate of the application exceeding a threshold, different points in time during a day, etc.

In one or more embodiments of the invention, the interaction frequency of each application is used to determine an interaction frequency of the resource. For example, the interaction frequency of each application may be statistically analyzed to determine an interaction frequency of the resource. Interaction frequencies of the applications may be averaged, aggregated, summed, or otherwise statistically manipulated to form a relevant metric that reflects an interaction frequency of the resource.

One or more embodiments of the invention, the interaction frequency of each application may be a multidimensional quantity. The first dimension of the interaction frequency may reflect a rate of interaction between an application and other entities. The second dimension of the interaction frequency may reflect an extent of interaction between the application and other entities. The interaction frequency may include any number of dimensions reflecting the manner in which application interacts with other components of the system without departing from the invention.

In step 434, the second tag selected based on the interaction frequencies of the applications. As discussed above, different interaction frequencies may be associated with different tags. The second tag may correspond to a tag associated with interaction frequency of the resource, or the interaction frequencies of the applications.

The method may end following step 434.

To further clarify embodiments of the invention, a non-limiting example is provided in FIGS. 5A-5G.

Example

Figure 5A:
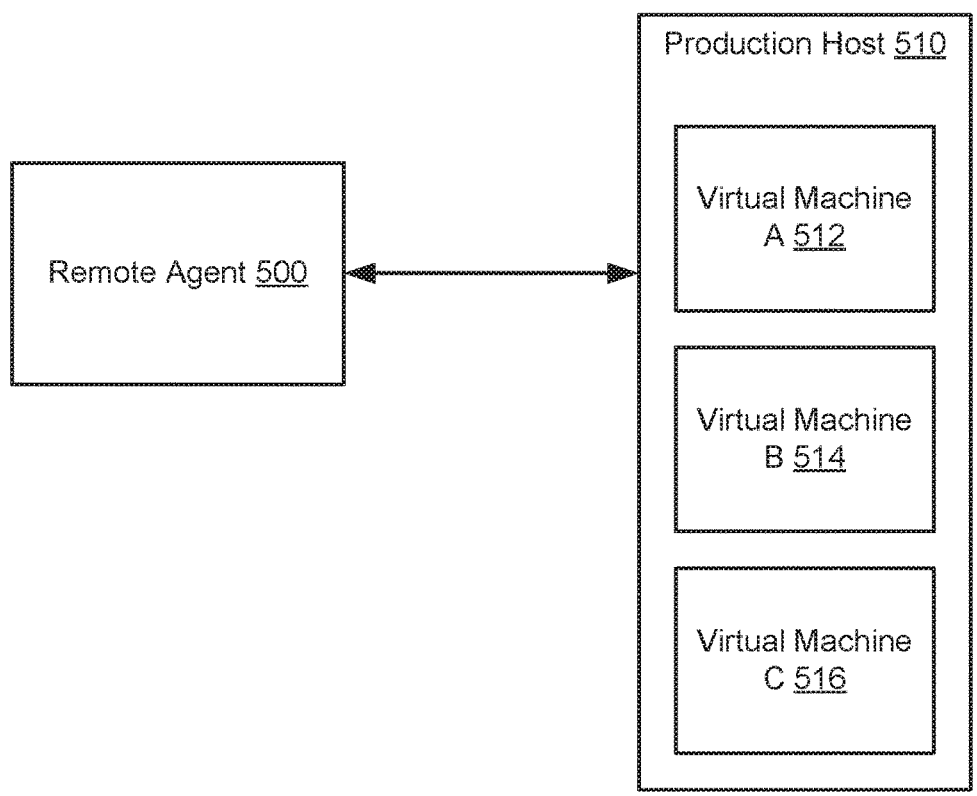
FIG. 5A shows a diagram of an example system at a first point in time.

Consider a scenario as illustrated in FIG. 5A where a remote agent (500) is providing disaster recovery services to a production host (510). The production host (510) may host three virtual machines (512, 514, 516). In the state of the system illustrated in FIG. 5A, a disaster recovery plan may prioritize the third virtual machine (516) for restoration over the other virtual machines.

Figure 5B:
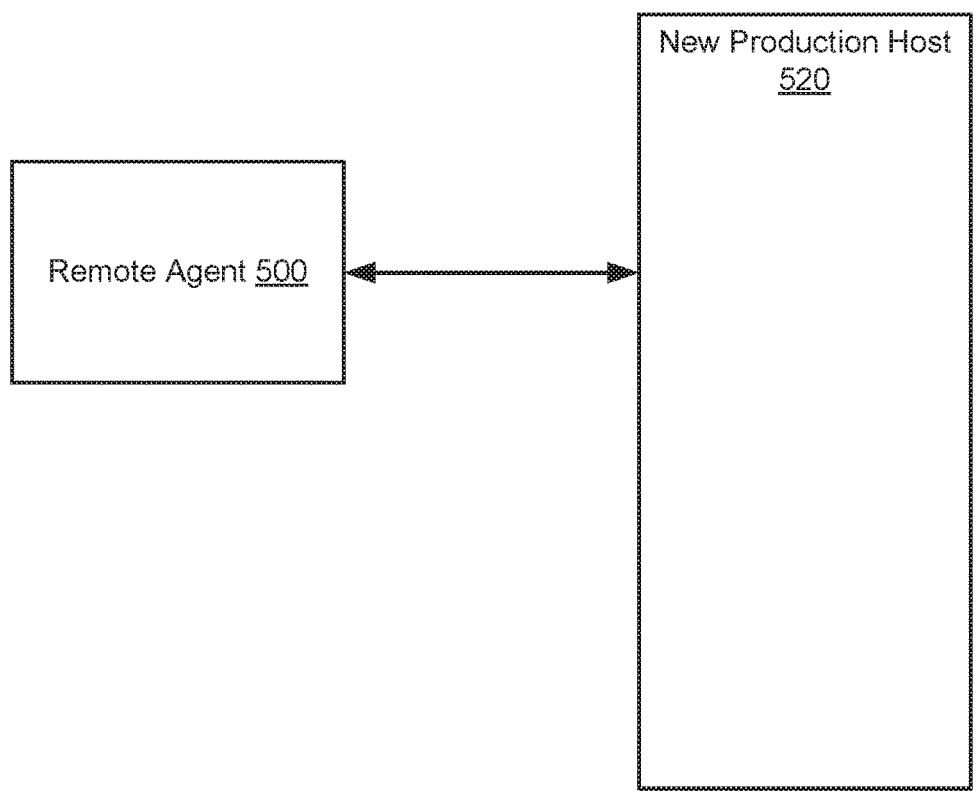
FIG. 5B shows a diagram of the example system of FIG. 5A at a second point in time.

At first point in time, a disaster impacts the production host (510) and takes it off-line. In response, the remote agent (500) initiates a disaster recovery by first securing a new location for the virtual machines to execute as illustrated in FIG. 5B. The new location is a new production host (520).

At the first point in time, the new production host (520) is not hosting any virtual machines or other entities.

Figure 5C:
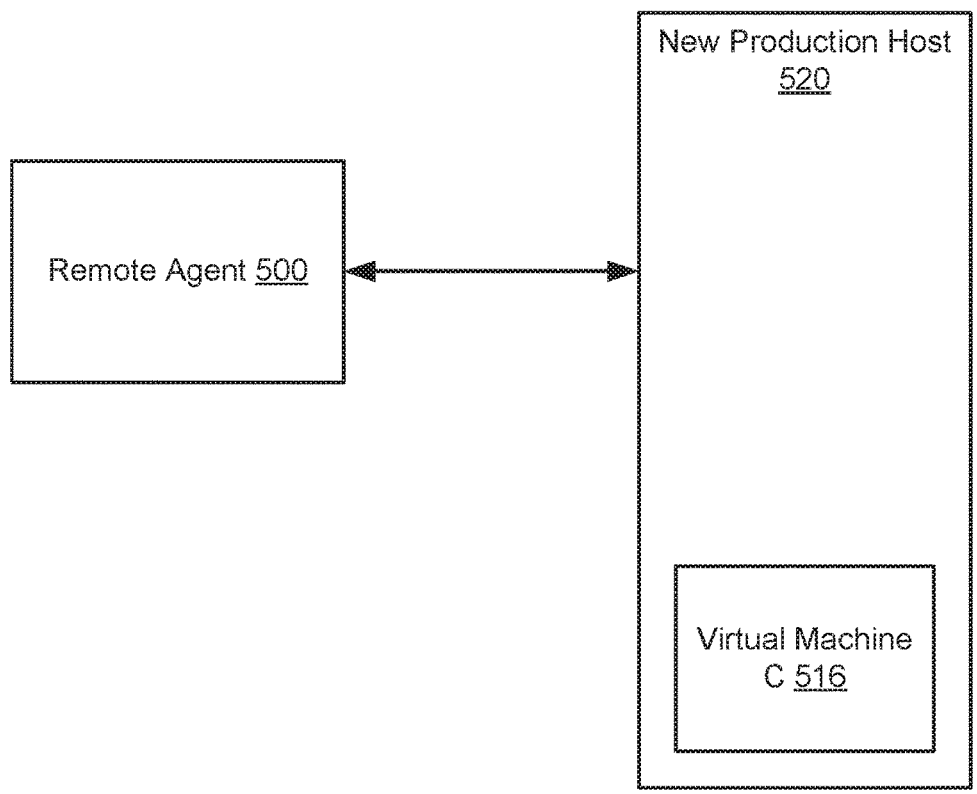
FIG. 5C shows a diagram of the example system of FIG. 5A at a third point in time.

As noted above, the disaster recovery plan prioritizes restoration of the third virtual machine (516) over the other virtual machines (512, 514). Based on this disaster recovery plan, the remote agent (500) instantiates the third virtual machine (516) in the new production host (520), as illustrated in FIG. 5C.

Figure 5D:
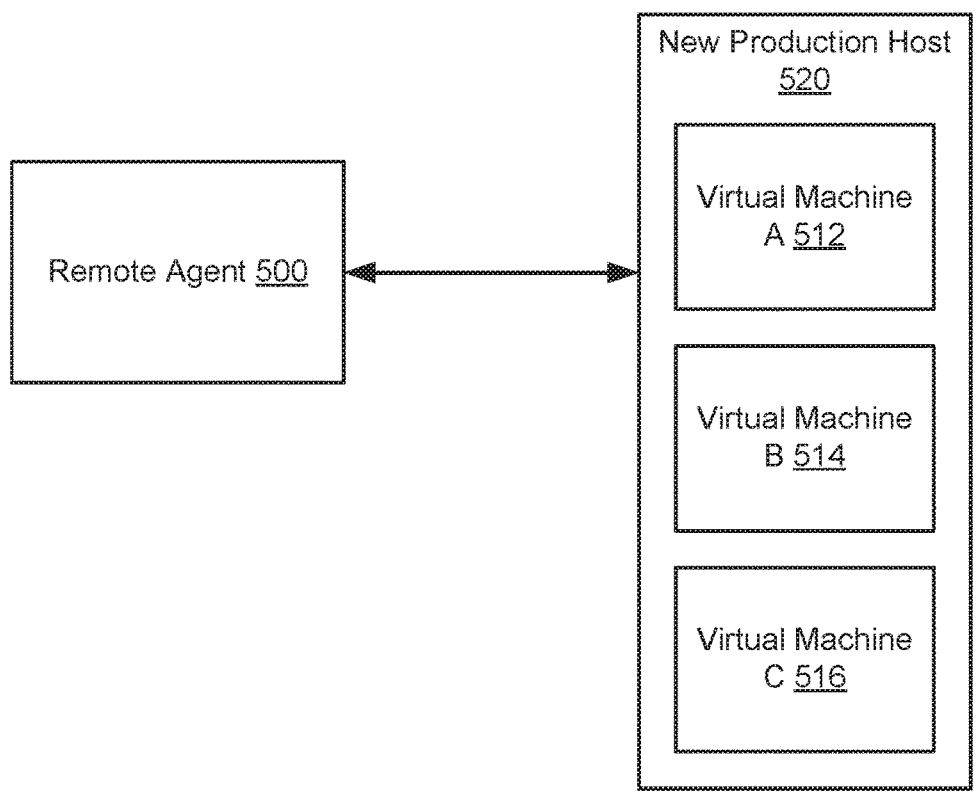
FIG. 5D shows a diagram of the example system of FIG. 5A at a fourth point in time.
Figure 5E:
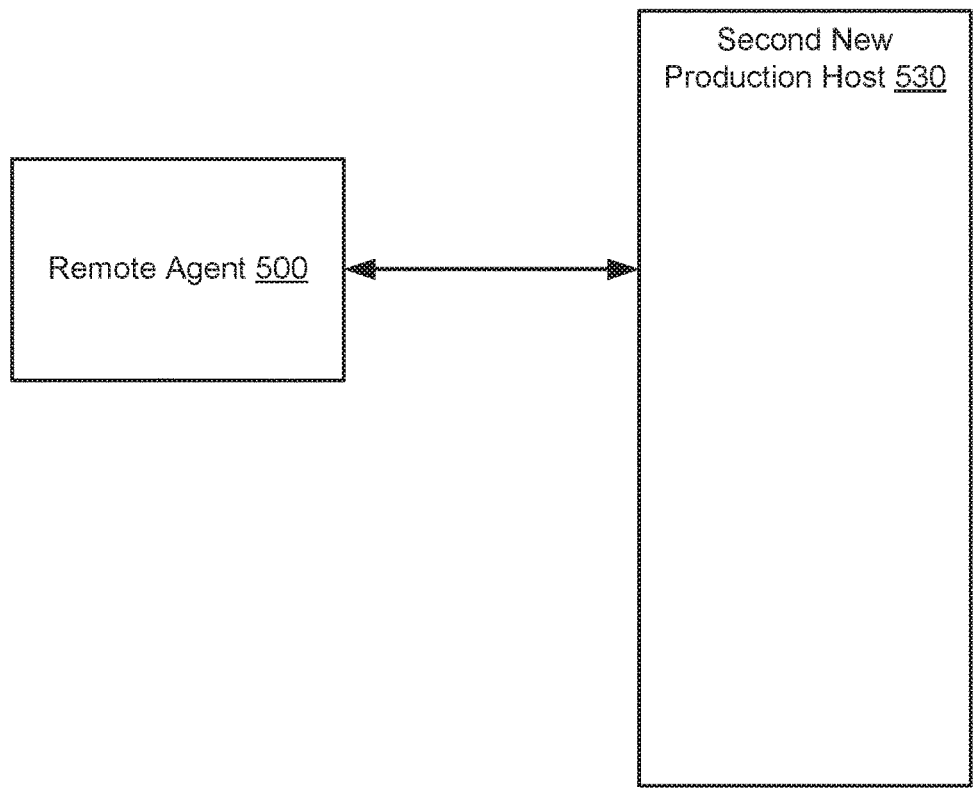
FIG. 5E shows a diagram of the example system of FIG. 5A at a fifth point in time.

After instantiating the third virtual machine (516), the remote agent (500) instantiates the first and second virtual machines in the new production host (520), as illustrated in FIG. 5D.

After instantiating all three virtual machines, a highly used database is instantiated on the first virtual machine (512). Due to the presence of the highly used database, the remote agent (500) performs the methods illustrated in FIGS. 4A-4C. Based on the methods, the remote agent (500) re-tags the first virtual machine (512) as "ultra high priority". The presence of this tag on the first virtual machine (512) changes the order in which the virtual machines (512, 514, 516) are restored and disaster recovery scenarios. Specifically, the first virtual machine (512) is prioritized above the other virtual machines, the second virtual machine (514) and the third virtual machine (516).

Figure 5F:
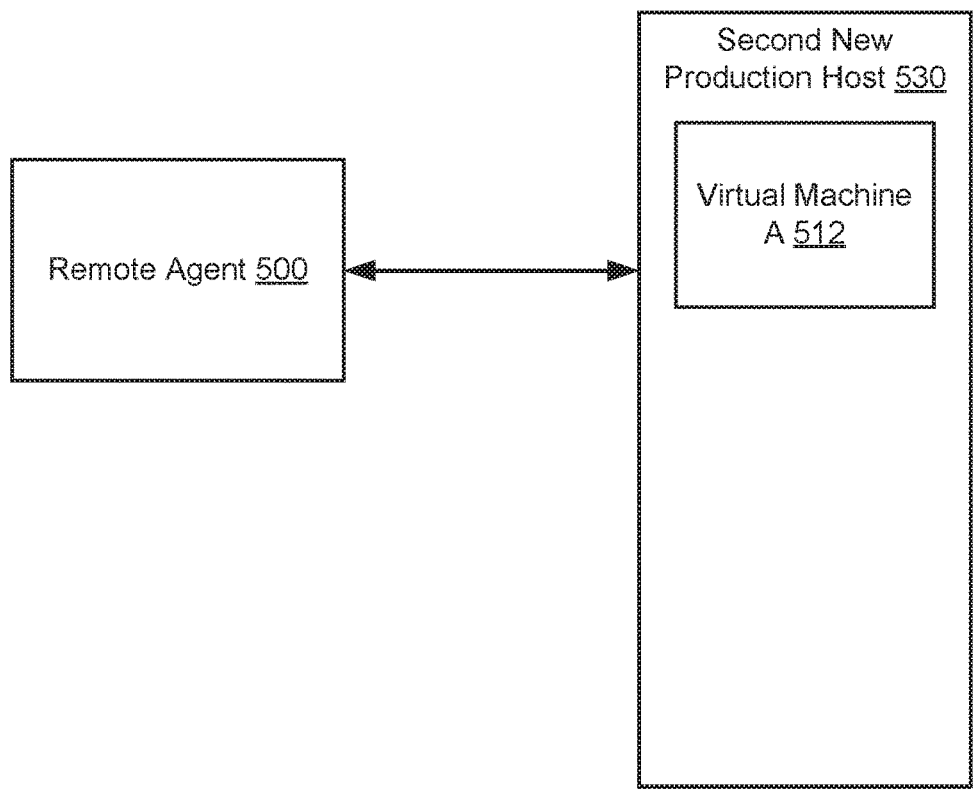
FIG. 5F shows a diagram of the example system of FIG. 5A at a sixth point in time.
Figure 5G:
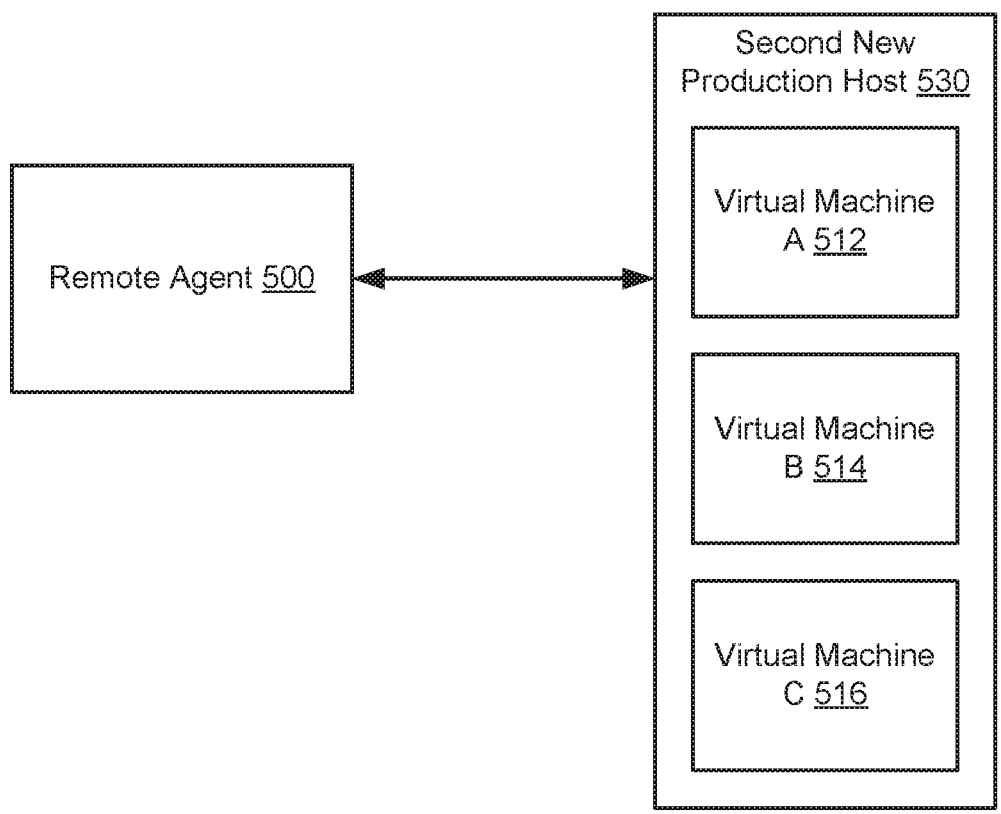
FIG. 5G shows a diagram of the example system of FIG. 5A at a seventh point in time.

The second point in time, the new production host (520) is impacted by second disaster taking the new production host (520) off-line. In response to the disaster, remote agent (500) performs a disaster recovery workflow. As part of the disaster recovery workflow, the remote agent (500) secures an additional location for execution of the virtual machines as illustrated in FIG. 5F. The additional location is a second new production host (530). Similar to the previous restoration performed in response to the previous disaster, the remote agent (500) begins instantiating virtual machines in the second new production host (530).

However, because of the change in tagging applied to the virtual machines the first virtual machine (512) is instantiated first and the second new production host (530) as illustrated in FIG. 5F. The third virtual machine (516) and the second virtual machine (514) are instantiated, in that order, on the second new production host (530).

In this manner, embodiments of the invention may enable re-prioritization of resources for restoration purposes during disaster recovery scenarios without user intervention.

End of Example

Figure 6:
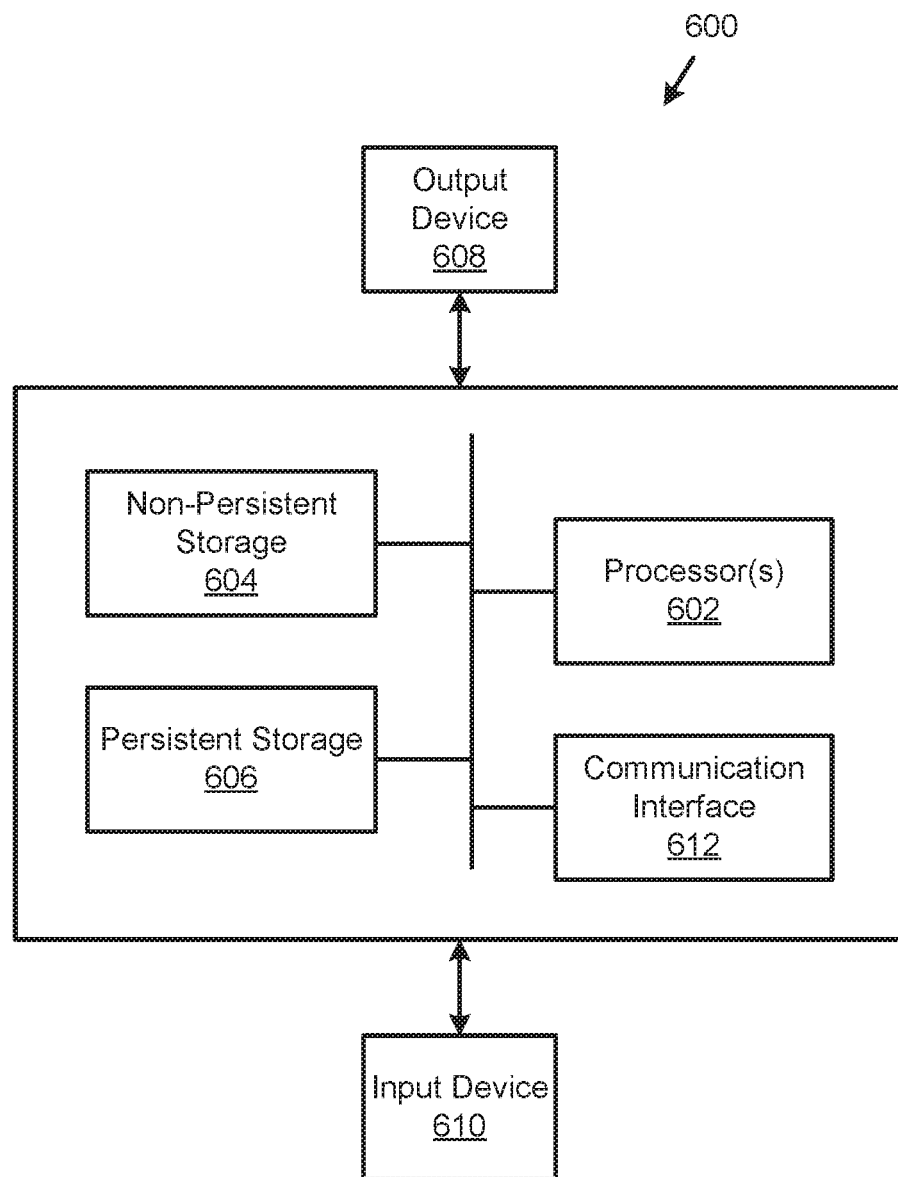
FIG. 6 shows a diagram of a computing device in accordance with one or more embodiments of the invention.

Any of the components of FIG. 1 may be implemented as distributed computing devices. As used herein, a distributed computing device refers to functionality provided by a logical device that utilizes the computing resources of one or more separate and/or distinct computing devices. As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

One more embodiments of the invention improve backup generation technology by automatically prioritizing resources for restoration purposes during disaster recovery scenarios. By doing so, embodiments of the invention improve the uptime of distributed systems that utilize backup technology. More specifically, embodiments of the invention may perform an analysis of the distributed system to identify resources that are likely to significantly contribute to the operational characteristics of the distribute system. For example, embodiments of the invention may perform an interaction analysis of each of the resources to identify the relative importance of each resource. Embodiments of the invention may apply appropriate tags based on the interaction analysis to ensure that the importance of each resource is taken into account when performing a restoration in response to a disaster.

In contrast contemporary methods, embodiments of the invention provide a system that is continuously updated without user intervention for disaster recovery purposes. Embodiments of the invention may further improve backup technology generally by reducing cognitive burden on system administrators that otherwise be required to design a backup recovery strategy. In contrast, embodiments of the invention do not require user intervention for setting up a backup recovery strategy.

Thus, embodiments of the invention directly address problems arising due to the nature of modern technological environments. Specifically, as distributed systems increase in their use and general complexity, the cognitive burden placed on system administrators for setting up of a disaster recovery strategy becomes too large because of the complexity of the distributed system.

Additionally, embodiments of the invention may directly improve uptime of the distributed system by decreasing the amount of time required to restore services provided by the distributed system. Thus, embodiments of the invention may directly improve the field of distributed systems, and, additionally, the field of backup technology.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A remote agent for managing resources, comprising:
   a persistent storage that stores disaster recovery policies keyed to tags applied to the resources; and
   a resource tagger programmed to:
   identify a change in a resource;
   in response to identifying the change:
   perform an application priority analysis of the resource to identify a first tag based on the change in the resource;
   perform an interaction frequency analysis of applications of the resource to identify a second tag;
   tag the resource with a tag, wherein the tag is one selected from a group consisting of the first tag and the second tag, wherein the tag is the first tag when the first tag has a higher priority than the second tag and where the tag is the second tag when the second tag has a higher priority than the first tag; and
   perform a disaster recovery for the resource using a disaster recovery policy of the disaster recovery policies that is keyed to the tag.

2. The remote agent of claim 1, wherein performing the disaster recovery for the resource comprises:
   identifying a plurality of the resources impacted by a disaster;
   ordering the resources based on priorities specified by the tags to obtain an ordering of the resources, wherein the tag is one of the tags; and
   performing restoration of the resources in an order specified by the ordering of the resources.

3. The remote agent of claim 1, wherein performing the interaction frequency analysis of the applications of the resource to identify the second tag comprises:
   for a predetermined time, identifying a number of interactions between each of the applications and other entities; and
   selecting the second tag based on a frequency of interaction based on the number and the predetermined time.

4. The remote agent of claim 1, wherein performing the interaction frequency analysis of the applications of the resource to identify the second tag comprises:
   for a predetermined time, identifying a number of interactions between each of the applications and other entities; and
   selecting the second tag based on a cardinality of the other entities.

5. The remote agent of claim 1, wherein performing the interaction frequency analysis of the applications of the resource to identify the second tag comprises:
   for a predetermined time, identifying a number of interactions between each of the applications and other entities;
   for each respective application of the applications, calculating an application frequency interaction based on a portion of the number of interactions associated with a respective interaction and the predetermined time; and
   selecting the second tag based on a largest application frequency interaction of the application frequency interactions.

6. The remote agent of claim 1, wherein the change in the resource is an instantiation of the resource.

7. The remote agent of claim 6, wherein the resource is a virtual machine.

8. The remote agent of claim 1, wherein one of the tags is a user-applied tag.

9. The remote agent of claim 8, wherein the user-applied tag does not specify any priority.

10. The remote agent of claim 9, wherein performing the application priority analysis of the resource to identify the first tag based on the change in the resource comprises:
    categorizing each of the applications to obtain a categorization;
    identifying a highest priority tag associated with the categorization; and
    using the highest priority tag as the first tag.

11. A method for managing resources, comprising:
    identifying a change in a resource;
    in response to identifying the change:
    performing an application priority analysis of the resource to identify a first tag based on the change in the resource;
    performing an interaction frequency analysis of applications of the resource to identify a second tag;
    tagging the resource with a tag, wherein the tag is one selected from a group consisting of the first tag and the second tag, wherein the tag is the first tag when the first tag has a higher priority than the second tag and the tag is the second tag when the second tag has a higher priority than the first tag; and
    performing a disaster recovery for the resource using a disaster recovery policy that is keyed to the tag.

12. The method of claim 11, wherein performing the disaster recovery for the resource comprises:
    identifying a plurality of the resources impacted by a disaster;
    ordering the resources based on priorities specified by the tags to obtain an ordering of the resources; and
    performing restoration of the resources in an order specified by the ordering of the resources.

13. The method of claim 11, wherein performing the interaction frequency analysis of the applications of the resource to identify the second tag comprises:
    for a predetermined time, identifying a number of interactions between each of the applications and other entities; and
    selecting the second tag based on a frequency of interaction based on the number and the predetermined time.

14. The method of claim 11, wherein performing the interaction frequency analysis of the applications of the resource to identify the second tag comprises:
    for a predetermined time, identifying a number of interactions between each of the applications and other entities; and
    selecting the second tag based on a cardinality of the other entities.

15. The method of claim 11, wherein performing the interaction frequency analysis of the applications of the resource to identify the second tag comprises:

for a predetermined time, identifying a number of interactions between each of the applications and other entities;

for each respective application of the applications, calculating an application frequency interaction based on a portion of the number of interactions associated with a respective interaction and the predetermined time; and selecting the second tag based on a largest application frequency interaction of the application frequency interactions.

16. A non-transitory computer readable medium comprising computer readable program code, which when executed by a computer processor enables the computer processor to perform a method for managing resources, the method comprising:

identifying a change in a resource;

in response identifying the change:

performing an application priority analysis of the resource to identify a first tag based on the change in the resource;

performing an interaction frequency analysis of applications of the resource to identify a second tag;

tagging the resource with a tag, wherein the tag is one selected from a group consisting of the first tag and the second tag, wherein the tag is the first tag when the first tag has a higher priority than the second tag and the tag is the second tag when the second tag has a higher priority than the first tag; and performing a disaster recovery for the resource using a disaster recovery policy that is keyed to the tag.

17. The non-transitory computer readable medium of claim 16, wherein performing the disaster recovery for the resource comprises:

identifying a plurality of the resources impacted by a disaster;

ordering the resources based on priorities specified by the tags to obtain an ordering of the resources; and performing restoration of the resources in an order specified by the ordering of the resources.

18. The non-transitory computer readable medium of claim 16, wherein performing the interaction frequency analysis of the applications of the resource to identify the second tag comprises:

for a predetermined time, identifying a number of interactions between each of the applications and other entities; and selecting the second tag based on a frequency of interaction based on the number and the predetermined time.

19. The non-transitory computer readable medium of claim 16, wherein performing the interaction frequency analysis of the applications of the resource to identify the second tag comprises:

for a predetermined time, identifying a number of interactions between each of the applications and other entities; and selecting the second tag based on a cardinality of the other entities.

20. The non-transitory computer readable medium of claim 19, wherein performing the interaction frequency analysis of the applications of the resource to identify the second tag comprises:

for a predetermined time, identifying a number of interactions between each of the applications and other entities;

for each respective application of the applications, calculating an application frequency interaction based on a portion of the number of interactions associated with a respective interaction and the predetermined time; and selecting the second tag based on a largest application frequency interaction of the application frequency interactions.

* * * * *